United States Patent
Ten Have et al.

(10) Patent No.: US 8,490,105 B2
(45) Date of Patent: Jul. 16, 2013

(54) PLUGGABLE COMPONENT INTERFACE

(75) Inventors: Wiechert Wilhelm Ten Have, Kockengen (NL); Christopher Hugh Rank, Longmont, CO (US); René Edward Alexander Quakkelaar, Ter Aar (NL); Michael Eugene Bryan, Boulder, CO (US); Alyson Denise Crabtree, Boulder, CO (US)

(73) Assignee: Sybase, Inc., Dublin, CA (US)

( * ) Notice: Subject to any disclaimer, the term of this patent is extended or adjusted under 35 U.S.C. 154(b) by 563 days.

(21) Appl. No.: 12/542,058

(22) Filed: Aug. 17, 2009

(65) Prior Publication Data

US 2011/0041134 A1    Feb. 17, 2011

(51) Int. Cl.
*G06F 9/46* (2006.01)

(52) U.S. Cl.
USPC .......................................... 718/104; 718/105

(58) Field of Classification Search
None
See application file for complete search history.

(56) References Cited

U.S. PATENT DOCUMENTS

| | | | | |
|---|---|---|---|---|
| 5,124,909 A | * | 6/1992 | Blakely et al. | 709/203 |
| 5,809,495 A | * | 9/1998 | Loaiza | 1/1 |
| 6,363,065 B1 | * | 3/2002 | Thornton et al. | 370/352 |
| 6,598,041 B1 | * | 7/2003 | Bernal et al. | 1/1 |
| 6,826,752 B1 | * | 11/2004 | Thornley et al. | 718/100 |
| 7,092,931 B1 | * | 8/2006 | Kaluskar et al. | 1/1 |
| 7,240,182 B2 | * | 7/2007 | Day et al. | 712/34 |
| 7,254,814 B1 | * | 8/2007 | Cormier et al. | 718/106 |
| 7,844,829 B2 | * | 11/2010 | Meenakshisundaram | 713/189 |
| 2005/0114858 A1 | * | 5/2005 | Miller et al. | 718/100 |

* cited by examiner

*Primary Examiner* — Jennifer To
*Assistant Examiner* — Wissam Rashid
(74) *Attorney, Agent, or Firm* — Sterne, Kessler, Goldstein & Fox P.L.L.C.

(57) ABSTRACT

A system, method, and computer program product are provided for initiating an application in communication with a database management system via a bridge. Application memory is allocated to the application from a shared memory space within the database management system.

13 Claims, 12 Drawing Sheets

PLUGGABLE COMPONENT INTERFACE

BACKGROUND OF INVENTION

1. Field of the Invention

The present invention relates generally to data services and, more specifically, coupling third-party software to a data services package.

2. Description of the Background Art

Sybase Adaptive Server Enterprise ("ASE") is a high-performance relational database management system ("RDBMS") used by a diverse set of clients for an equally diverse set of applications. Database products in general are found in use in many settings, and therefore must adapt to each particular database administrator's needs.

Various competing database products have afforded end-users some level of customization of the product by implementing a number of software features which several prominent end-users may request. For example, Sybase has previously demonstrated the ability to integrate the Java Virtual Machine ("JVM") into ASE in order to run high-level object oriented code from within ASE. Such a feature is desirable to a number of clients. However, further maintenance of ASE with integrated JVM would require maintenance not only of ASE, but also of the various integrated components.

The task of maintaining not only the primary database software, but also each of the tightly-integrated parts, would be daunting. It would likely require a dedicated team for the purpose of porting the component to be integrated, such as JVM, and to maintain that component. Such maintenance would involve not only ensuring future compatibility with the revisions to the ASE core components, but also applying bug fixes and other updates to the JVM itself.

Moreover, it is possible to abandon certain integrated components once they become obsolete. However, even such deprecated functionality often remains through several iterations of a software product in order to ensure that end-users have an opportunity to rewrite their applications accordingly, without forcing the end-users to remain on an unsupported version of the software. This causes the database software footprint to grow from both new features as well as the obsolete features.

Enabling third party integration with ASE presents several problems itself. If the third party software contains bugs or signals error messages to the ASE, the software's erratic behavior could affect the performance of the ASE software. Moreover, providing the typical hooks for integration with a software package like ASE may expose security breaches within the ASE software which third party application developers could exploit. Additionally, function calls made to the third party applications may require a long wait time for a response, blocking ASE and hanging or delaying critical processes.

Integrating third party software with ASE also presents legal issues. Licensing issues with the third party software might prevent integration with ASE, or may have terms for integration which cannot be met based on the functional character of ASE.

Accordingly, what is desired is a database system which provides component integration without requiring a high level of core integration support, while at the same time defending against issues that arise from integration with third party applications.

SUMMARY OF INVENTION

Embodiments of the invention include a system comprising a database management system and a bridge tightly-integrated with the database management system, wherein the bridge is configured to initiate an application in communication with the database management system via the bridge and allocate application memory to the application from a shared memory space within the database management system.

Further embodiments of the invention include a method comprising initiating an application in communication with a database management system via a bridge and allocating application memory to the application from a shared memory space within the database management system.

Further embodiments of the invention include a computer-readable medium having stored thereon computer-executable instructions that, if executed by a computing device, cause the computing device to perform a method comprising initiating an application in communication with a database management system via a bridge and allocating application memory to the application from a shared memory space within the database management system.

Further embodiments of the invention include a method comprising receiving a function call from a task, translating the function call to a function pointer, allocating a native thread, wherein the native thread is provided with the function pointer and wherein the native thread is configured to execute the function located at the function pointer, receiving the result from the function, and providing the result to the task as a return value to the function call.

Further embodiments of the invention include a computer-readable medium having stored thereon computer-executable instructions that, if executed by a computing device, cause the computing device to perform a method comprising receiving a function call from a task, translating the function call to a function pointer, allocating a native thread, wherein the native thread is provided with the function pointer and wherein the native thread is configured to execute the function located at the function pointer, receiving the result from the function, and providing the result to the task as a return value to the function call.

Further embodiments of the invention include a system comprising a memory storing a first module configured to receive a function call from a task, a second module configured to translate the function call to a function pointer, a third module configured to allocate a native thread, wherein the native thread is provided with the function pointer and wherein the native thread is configured to execute the function located at the function pointer, a fourth module configured to receive the result from the function, and a fifth module configured to provide the result to the task as a return value to the function call, and one or more processors configured to process the modules.

Further embodiments of the invention include a method comprising receiving a function call from a task, translating the function call to a function pointer, wherein the function pointer points to an application function within an application, and wherein the function call and the application are associated with a same slot identifier, requesting that the application be bootstrapped and configured in a manner which will enable the application to provide a result to the function call, allocating a native thread, the native thread configured to call the application function using the function pointer, receiving the result from the function, and providing the result to the task.

Further embodiments of the invention include a computer-readable medium having stored thereon computer-executable instructions that, if executed by a computing device, cause the computing device to perform a method comprising receiving a function call from a task, translating the function call to a function pointer, wherein the function pointer points to an application function within an application, and wherein the function call and the application are associated with a same slot identifier, requesting that the application be bootstrapped and configured in a manner which will enable the application to provide a result to the function call, allocating a native thread, the native thread configured to call the application function using the function pointer, receiving the result from the function, and providing the result to the task.

Further embodiments of the invention include a system comprising a memory storing a first module configured to receive a function call from a task, a second module configured to translate the function call to a function pointer, wherein the function pointer points to an application function within an application, and wherein the function call and the application are associated with a same slot identifier, a third module configured to request that the application be bootstrapped and configured in a manner which will enable the application to provide a result to the function call, a fourth module configured to allocate a native thread, the native thread configured to call the application function using the function pointer, a fifth module configured to receive the result from the function, and a sixth module configured to provide the result to the task, and one or more processors configured to process the modules.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

Figure 1:
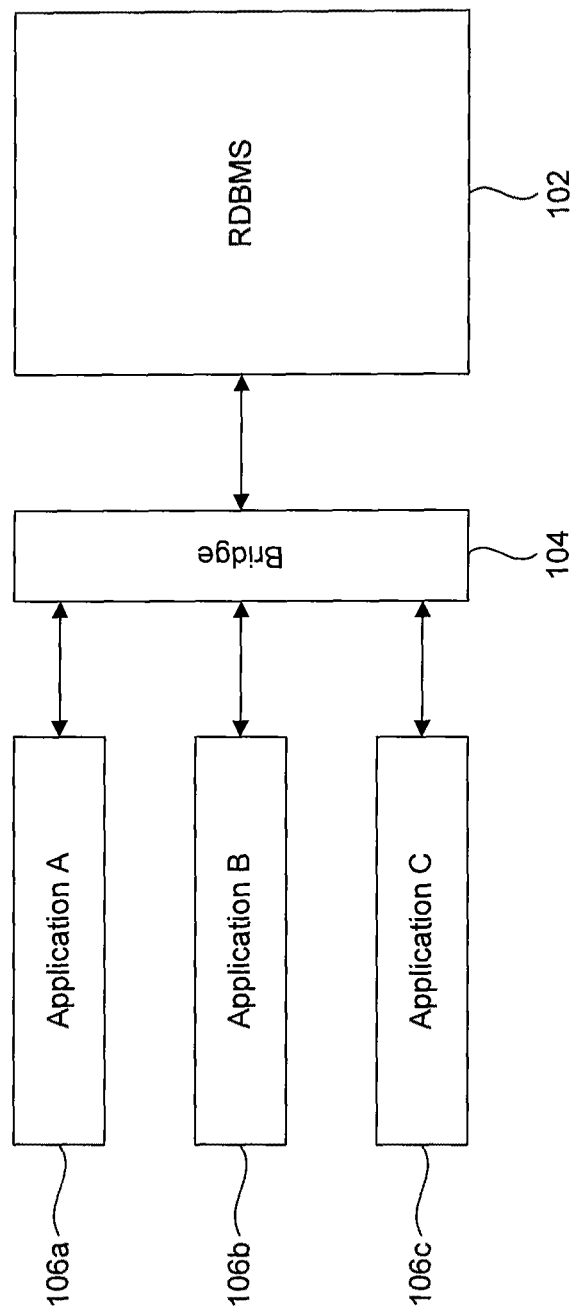
FIG. 1 is an architectural model by which a Relational Database Management System ("RDBMS") is able to integrate one or more applications using a bridge, in accordance with an embodiment of the present invention.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

I. Introduction

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the art that the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein.

FIG. 1 is an architectural model 100 by which a Relational Database Management System ("RDBMS") 102 such as Sybase Adaptive Server Enterprise ("ASE") is able to integrate one or more applications 106a-106c using a bridge 104, in accordance with an embodiment of the present invention. RDBMS 102 can be any database management system, but ASE is discussed throughout by way of example, and not limitation.

Rather than incorporating applications 106a-106c (generally "applications 106") into a monolithic executable for RDBMS 102, the applications 106 are able to plug in to the RDBMS 102 while remaining sandboxed from other applications 106, direct accesses to the operating system, and the RDBMS 102 itself, in accordance with an embodiment of the present invention. Moreover, the applications 106 can be treated as black boxes, enabling them to plug in to RDBMS 102 regardless of their particular program internals. In accordance with an embodiment of the present invention, the bridge 104 can remove an application 106 from the system in the event of an error or other threat to the integrity of the RDBMS 102.

The conceptual framework of architectural model 100 is termed a Pluggable Component Interface ("PCI"). The bridge 104 is therefore sometimes termed the PCI Bridge.

As an example of the types of applications 106 which can be integrated in the manner shown in FIG. 1, a simple HTTP server within the RDBMS 102 could be provided to enable configuration and monitoring services using a web browser as a front end. Traditionally, such functionality would have had to be built in to the monolithic RDBMS 102 executable. Using the architecture model 100, however, it is possible to incorporate many third-party applications, as well as first-party components, as an application 106 coupled over bridge 104 without requiring any modification to the monolithic RDBMS 102 code itself.

One skilled in the relevant arts will appreciate that the types of applications 106 which can be integrated as in FIG. 1 is varied and limitless. Another example would be to embed scripting support within the RDBMS 102 by providing a script interpreter as a plug-in application 106. Support for general programming language integration is possible as well. Even traditionally fixed assets within the RDBMS 102 can be migrated to PCI applications to improve development processes.

The PCI Bridge 104 provides a number of facilities for the integration of applications 106. One skilled in the relevant arts will appreciate that not all of the following mechanisms are necessary to implement architectural model 100, and are provided by way of example, and not limitation. PCI Bridge 104 is able to provide management of native operating system threads and processes in an embodiment. PCI Bridge 104 is further able to provide for memory management in a further embodiment. In additional embodiments, PCI Bridge 104 is able to provide synchronization management, data access service support, configuration management, function dispatching on demand with automatic plug-in loading, specific signal wrappers and exception handling, platform run-time support, dynamic instrumentation facility, and a dedicated error log channel towards the RDBMS log mechanism. These features are discussed in further detail below.

II. Integrating Applications with RDBMS

Figure 2:
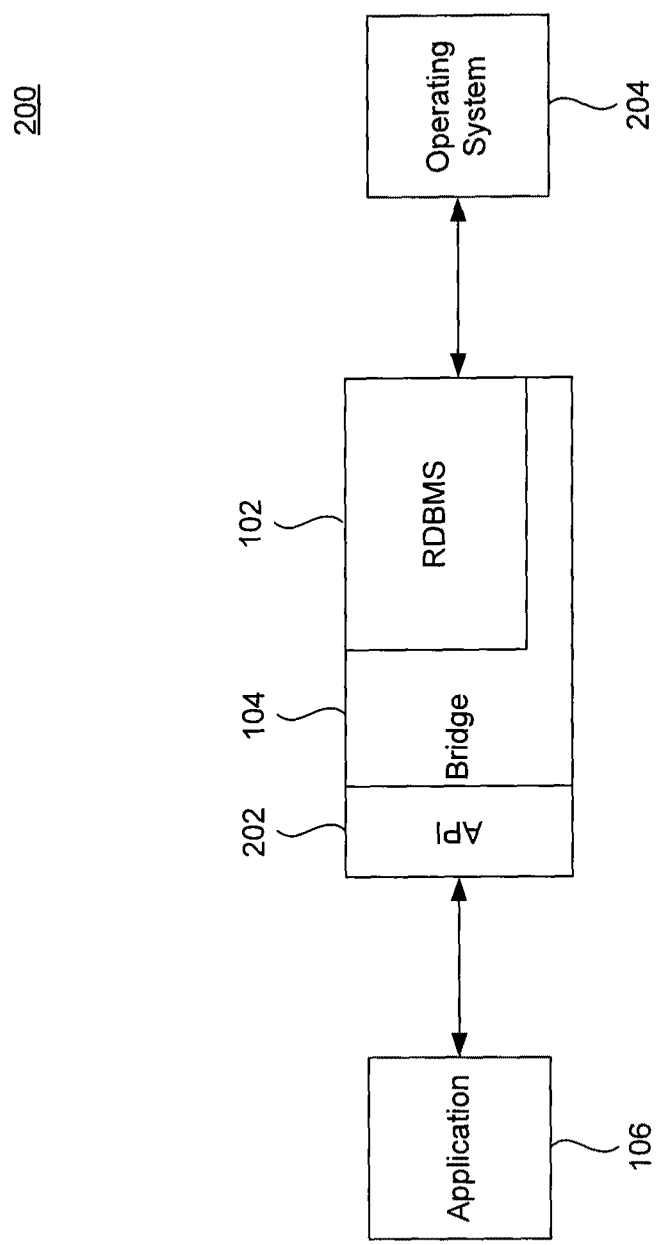
FIG. 2 is an architectural model by which an application is integrated with an RDBMS, in accordance with an embodiment of the present invention.

FIG. 2 is an architectural model 200 by which an application 106 is integrated with RDBMS 102, in accordance with an embodiment of the present invention. The application 106 communicates via PCI Bridge 104 with RDBMS 102 as before. However, RDBMS 102 exposes a transparent API 202, which is used by the application 106 when it needs to access operating system resources, in accordance with an embodiment of the present invention. RDBMS 102 can resolve calls to API functions by interfacing with the operating system 204, thereby managing resource control and process control.

By providing transparent API 202, an application 106 continues using default platform memory allocation functions, such as, for example, malloc( ), calloc( ), free( ), or realloc( ). It is not necessary to rewrite application 106, and the RDBMS 102 will then intercept these memory allocation functions (or, indeed, any functions) and service the function itself. Servicing the function within RDBMS 102 may ultimately involve a call to the actual operating system function, or other function, which the application 106 intended to call, but this is not strictly necessary. For example, application 106 may request to open a file using a standard operating system call, and may have actual permission to do so based on operating system permissions. However, RDBMS 102 can intercept this function, and perhaps deny the open file request based on its own requirements.

By way of example, and not limitation, memory allocation (e.g., malloc calls) normally made by an application 106 directly to operating system 204 are instead made to a memory allocation function provided by API 202, which serves to intercept the function call. RDBMS 102 then allocates memory for the application's use. In accordance with an embodiment of the present invention, RDBMS 102 allocates memory from a PCI memory pool used for that purpose.

In accordance with an embodiment of the present invention, the integration between PCI bridge 104 and RDBMS 102 is tight, and does not require a network stack for communications. In accordance with a further embodiment of the present invention, PCI Bridge 104 is part of the same monolithic executable as RDBMS 102, and is maintained concurrently therewith. In the embodiment depicted in FIG. 2, the RDBMS 102, PCI Bridge 104, and API 202 are part of the same monolithic executable.

Figure 3:
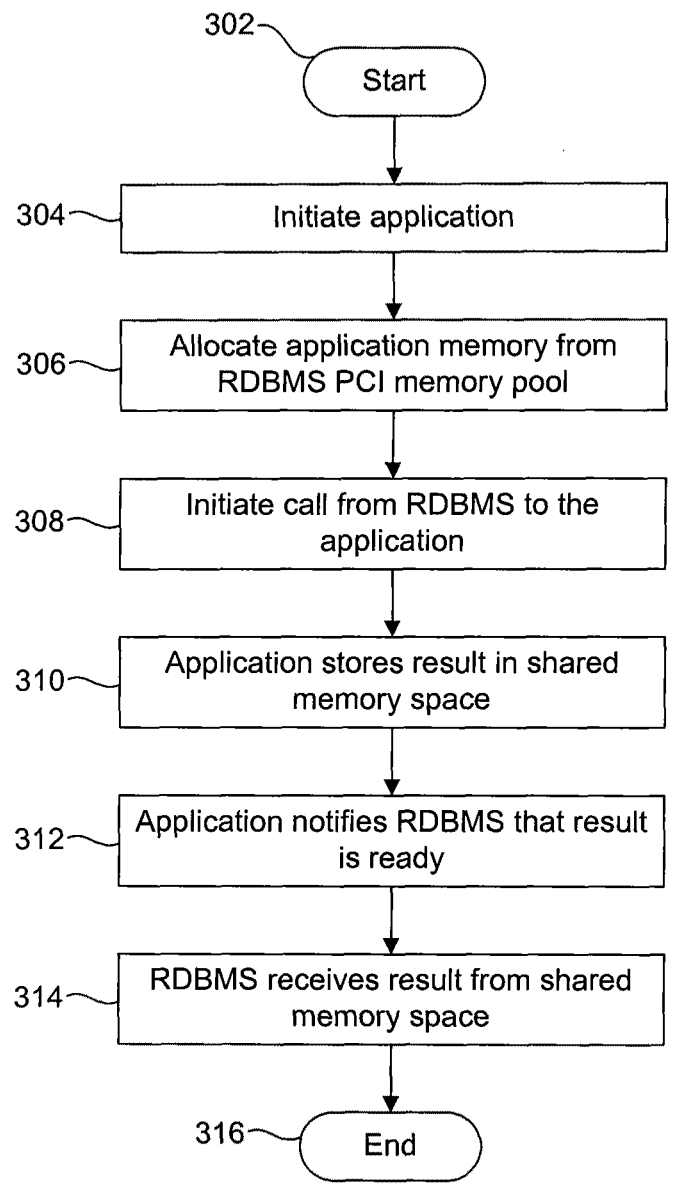
FIG. 3 is a flowchart illustrating steps by which an application operates within the context of architectural model, in accordance with an embodiment of the present invention.

FIG. 3 is a flowchart 300 illustrating steps by which an application 106 operates within the context of architectural model 200, in accordance with an embodiment of the present invention. The method begins at step 302 and proceeds to step 304 where the application is initiated. At step 306, memory for the application 106 is allocated from the RDBMS 102 PCI memory pool. At this point, application 106 is operational and able to accept any calls.

At step 308, a call is initiated from the RDBMS 102 to the application 106. By way of example, and not limitation, a call to the application 106 is embedded within a query being executed by RDBMS 102. For example, application 106 may be a script parsing engine, such that a script may be embedded within a query made to RDBMS 102. RDMBS 102 can parse the script by initiating a call to parse the script at step 308.

Once the application 106 has completed its processing, it stores the result in a shared memory space at step 310. One skilled in the relevant arts will appreciate that RDBMS 102 can request a result from application 106 and wait for the result to be returned to it. However, the best mode of operation is to allow the application 106 to compute the result asynchronously from the RDBMS 102, thereby preventing the application 106 from blocking the RDBMS 102. Accordingly, the application 106 computes the result and stores it in a shared memory space 310. At step 312, the application then notifies the RDBMS 102 that the result is ready.

At step 314, the RDBMS 102 receives the result from the shared memory space. In accordance with an embodiment of the present invention, the result is retrieved from the shared memory space by the PCI Bridge and provided to the RDBMS 102 as a return result to the call from step 308. The method ends at step 316.

Figure 4:
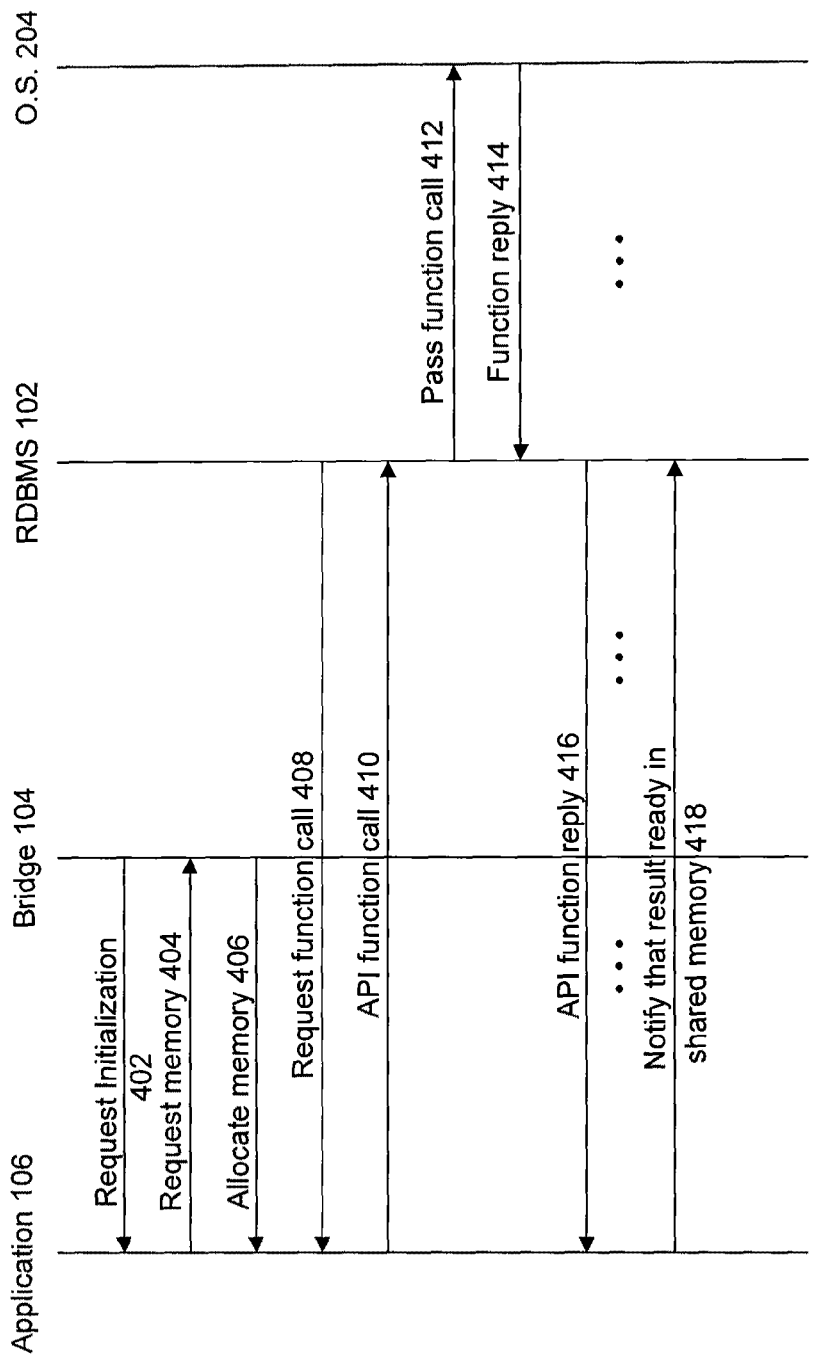
FIG. 4 is a flow diagram illustrating the communications process for the method depicted in flowchart 300 of FIG. 3 and between the components of architectural model 200 of FIG. 2, in accordance with an embodiment of the present invention.

FIG. 4 is a flow diagram 400 illustrating the communications process for the method depicted in flowchart 300 of FIG. 3 and between the components of architectural model 200 of FIG. 2, in accordance with an embodiment of the present invention.

As previously noted, PCI Bridge 104 is tightly integrated with RDBMS 102, in accordance with an embodiment of the present invention. Accordingly, one skilled in the relevant arts will appreciate that communications to and from each of the PCI Bridge 104 or RDBMS 102 may be directed to or from a component other than the one it is shown to be associated with, depending on the particular implementation.

At step 402, PCI Bridge 104 requests the initialization of application 106. Application 106 then requests a memory allocation at step 404, and the allocated memory space is provided at step 406. At this point, application 106 is fully initialized and ready to accept calls.

At step 408, RDBMS 102 calls a function within application 106, as in step 308 of FIG. 3. At step 410, application 106 requires a resource from operating system 204, and initiates a call to an API function within RDBMS 102 to provide the resource. RDBMS 102 essentially provides an API which wraps the operating system resource requests, and then passes the function calls at step 412 to the operating system, to which the operating system 204 provides a reply at step 414. In accordance with an embodiment of the present invention, RDBMS 102 is able to handle the API function call 410 without requesting resources from the operating system 204. Regardless of the methodology by which RDBMS 102 allocates the requested resources, a reply to the original API function call is provided at step 416.

Once application 106 has completed its processing, it provides a result to the function call 408 in a shared memory location. Application 106 then notifies RDBMS 102 that the result is ready at step 418. RDBMS 102 is then able to receive the result from the shared memory via a function return value, for example, without being blocked while waiting for the result.

Figure 5:
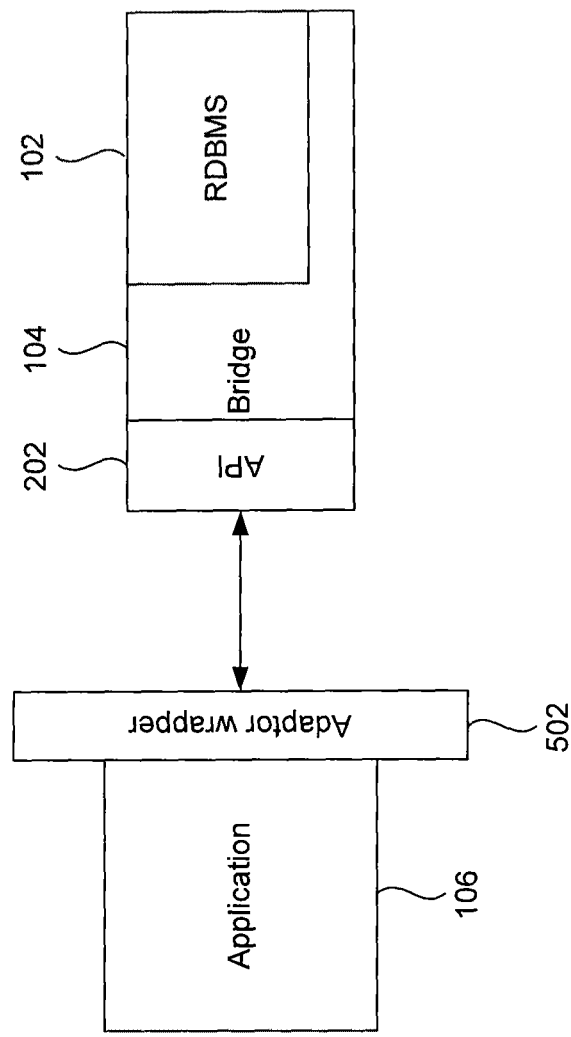
FIG. 5 is a further architectural view of the PCI system which enables third party applications to be readily integrated into the system, in accordance with an embodiment of the present invention.

FIG. 5 is a further architectural view 500 of the PCI system which enables third party applications 106 to be readily integrated into the system, in accordance with an embodiment of the present invention. As previously noted, PCI Bridge 104 is tightly integrated with RDBMS 102 in accordance with an embodiment of the present invention. Accordingly, the method of interfacing with the RDBMS 102 is not necessarily identical as in the environment application 106 would encounter if running natively directly on top of the operating system.

First party applications or third party applications developed specifically for the purpose of integrating with RDBMS 102 in this manner are able to utilize function calls directly into PCI Bridge 104 and RDBMS 102 to substitute for resource control calls to the operating system. For example, a first party application or a specially-developed third party application can use a memory allocation function provided by RDBMS 102 for its memory allocation uses, and would be designed not to rely on the operating system's memory allocation calls.

However, many third-party applications can be integrated without modifying the underlying application 106 by wrapping the application 106 with an adaptor layer 502. The adaptor 502 translates calls made by the application 106 to the operating system into functions handled by RDBMS 102, and provides the calls thereto. This is useful in, for example, integrating a Java Virtual Machine without the need to modify the underlying source code. It is then possible to maintain included application 106 in an updated state by modifying only the wrapper 502 to conform to any code changes. This shortens the upgrade cycle for applications 106 integrated with RDBMS 102 when compared to coding the application 106 into the monolithic RDBMS 102 executable.

As previously noted in flowchart 300 of FIG. 3, applications 106 provide results to the RDBMS 102 in an asynchronous manner, in accordance with an embodiment of the present invention. Applications 106 store the requested result in a shared memory space, and then notify the RDBMS 102 that the data in the shared memory space is valid and is ready to be retrieved.

III. Asynchronous Function Execution

Figure 6:
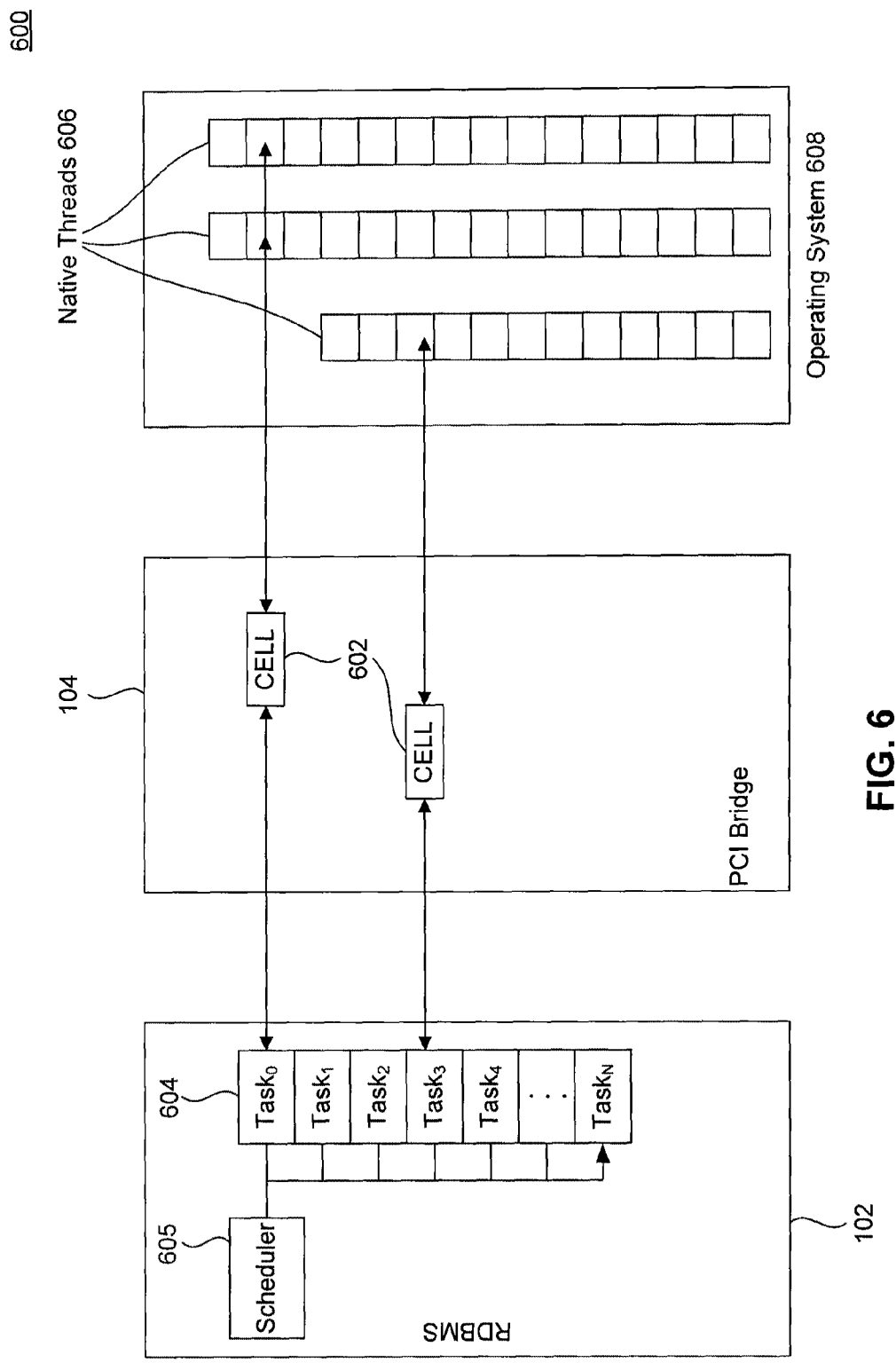
FIG. 6 is a framework for asynchronous function execution, in accordance with an embodiment of the present invention.

FIG. 6 is a framework 600 for asynchronous function execution, in accordance with an embodiment of the present invention. RDBMS 102 manages a number of RDBMS tasks 604 (e.g., "ASE tasks" in the case of ASE), for which the RDBMS provides memory management, scheduling (such as through the use of schedule 605), and other services. These RDBMS tasks are commonly user-written tasks which perform queries into the RDBMS 102 database, as well as calling other functions provided by the RDBMS 102.

Tasks 604 can be developed, in accordance with an embodiment of the present invention, to make a function call to be serviced by an application 106. However, when the task 604 makes such a function call, the RDBMS 102 runs the risk of being stalled while the application 106 executes and provides an answer to the function call. The framework 600 enables tasks 604 to send this function request to an application 106 without stalling RBDMS 102.

Moreover, it is useful to fully isolate the execution context between the RDBMS 102 and the application 106 in order to prevent execution errors within application 106 from affecting the performance of RDBMS 102.

Fully isolated execution context between RDBMS 102 and application 106 is accomplished by providing cells 602, in accordance with an embodiment of the present invention. A cell 602 is assigned for a particular PCI slot ID, and is shared between the application 106 (and its native threads 606) and the requesting task 604. It is this shared memory space where an application 106 is able to write any results for task 604 to retrieve asynchronously, in accordance with an embodiment of the present invention.

Figure 7:
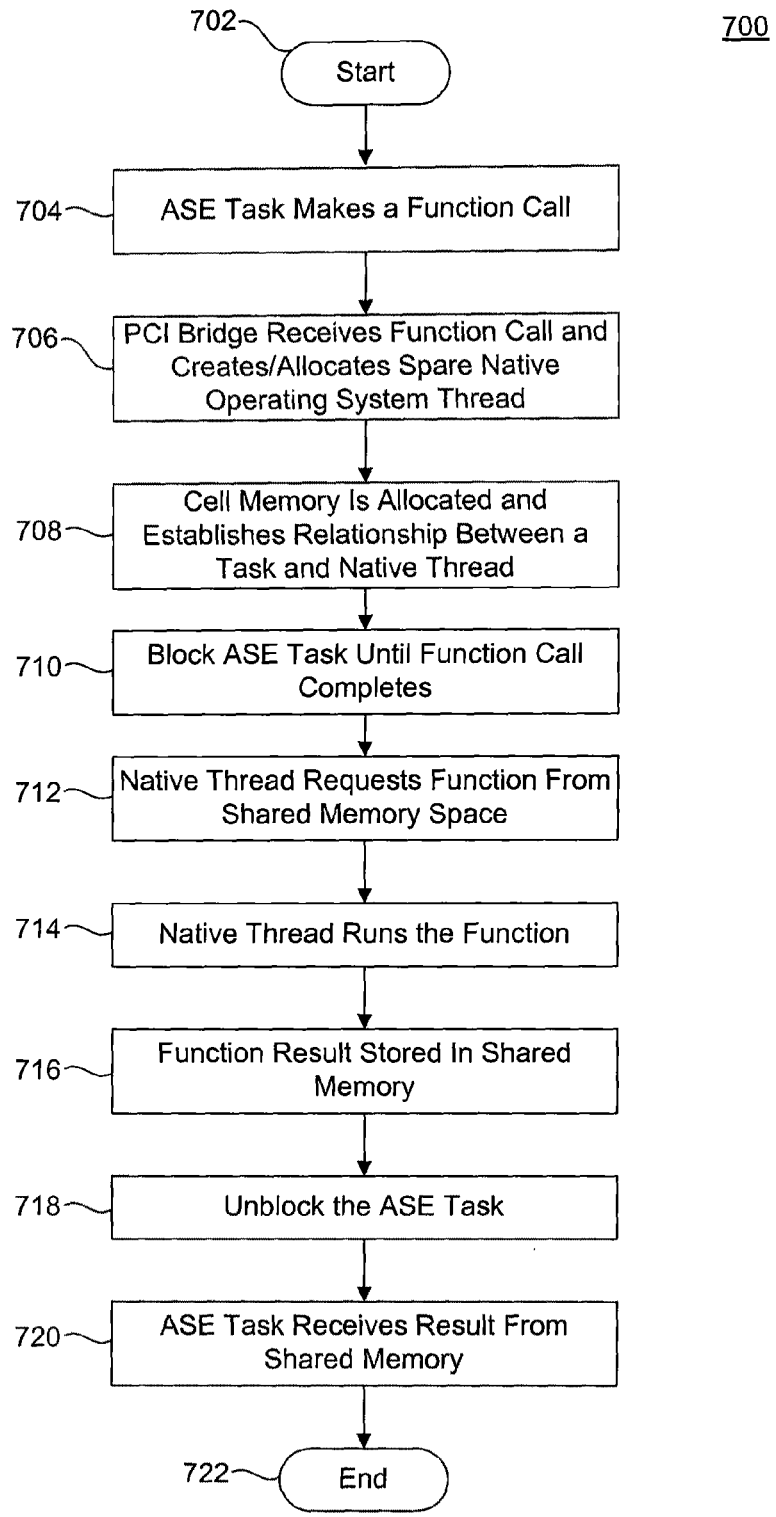
FIG. 7 is a flowchart 700 illustrating steps by which asynchronous function execution is performed, in accordance with an embodiment of the present invention.

FIG. 7 is a flowchart 700 illustrating steps by which asynchronous function execution is performed, in accordance with an embodiment of the present invention. The method begins at step 702 and proceeds to step 704 where an ASE task 604 makes a function call. This function call is received by the PCI bridge at step 706. At this point as well, the PCI bridge 104 creates a native thread or allocates a spare native thread 606.

In accordance with an embodiment of the present invention, PCI bridge 104 maintains a set of spare native threads 606 which are ready to be assigned when a function call is received from a task 604. These native threads 606 may be placed by the PCI bridge 104 in a wait state, or they may return to a main loop while awaiting instructions. One skilled in the relevant arts will appreciate that other techniques exist for placing a native thread 606 in an idle condition when no function call is present.

At step 708, the PCI bridge 104 allocates a cell memory 602, in accordance with an embodiment of the present invention. This cell memory is a shared memory location that is accessible to the task 604 and the native thread 606, in accordance with a further embodiment of the present invention. One skilled in the relevant arts will appreciate that the precise location of the cell memory 602, whether within the PCI bridge or elsewhere may vary with implementation details, and the cell memory 602 is shown within the PCI bridge by way of example, and not limitation. By allocating the cell memory 602, the PCI bridge establishes a relationship between the task 604 making the function call, and one or more native threads 606.

Now that the task 604 has made a function call, which has been sent to the PCI bridge, the task 604 must wait for the result. In accordance with an embodiment of the present invention, PCI bridge 104 is able to notify scheduler 605 that task 604 is blocked and should not be scheduled. This enables scheduler 605 to pull the task 604 from the scheduling rotation. In doing so, other tasks 604, as well as the RDBMS 102, are free to continue execution while task 604 awaits a result to the function call. Rather than scheduling task 604 for several processing timeslices during which it would be blocked, scheduler 605 can devote the processing time to other processor consumers with greater need.

With the ASE task 604 blocked, the newly-allocated or awoken native thread 606 retrieves the function from cell memory 602. In accordance with an embodiment of the present invention, native thread 606 is a generic component configured to retrieve a function pointer from cell memory 602 upon being allocated or awoken. Native thread 606 then runs whatever function is pointed to by the function pointer at step 714, and is not required to know any specifics regarding the function. As PCI bridge 104 is responsible for managing the slot locations of various applications 106, it is the PCI bridge which knows how to properly configure the pointer location for any function call made by a task 604.

The function referred to in the above paragraph can be located in many different places within any number of memory spaces. By way of example, and not limitation, the function may be a direct call to a function provided by the underlying operating system. In a further example, the function may be a call directly to an application 106. In an additional example, the function may be a call to a PCA 502 wrapping an application 106. One skilled in the relevant arts will recognize that the pointer may point to any location containing one or more instructions for the native thread 606 to execute, and the aforementioned locations are presented by way of example, and not limitation.

After the native thread 606 has called the function and the function has produced a result, the result is stored in the shared memory location, i.e. cell 602, at step 716. With the result ready, it is now possible for task 604 to retrieve the result from cell 602. At step 718, PCI bridge 104 instructs scheduler 605 to schedule task 604 in its normal rotation to ensure that task 604 is eventually serviced. In accordance with an embodiment of the present invention, scheduler 605 schedules task 604 with a high priority to compensate for the time during which the task 604 was removed from the scheduling rotation.

When task 604 is unblocked, it proceeds to receive the result from cell 602 at step 720. In accordance with an embodiment of the present invention, task 604 receives the result as a return value to the function call of step 704. The method ends at step 722.

By removing the task 604 from the scheduling rotation while it is blocked and awaiting a reply to the function call, and only putting the task 604 back in the scheduling rotation when the reply to the function call is ready, a truly asynchronous function execution methodology is available.

Figure 8:
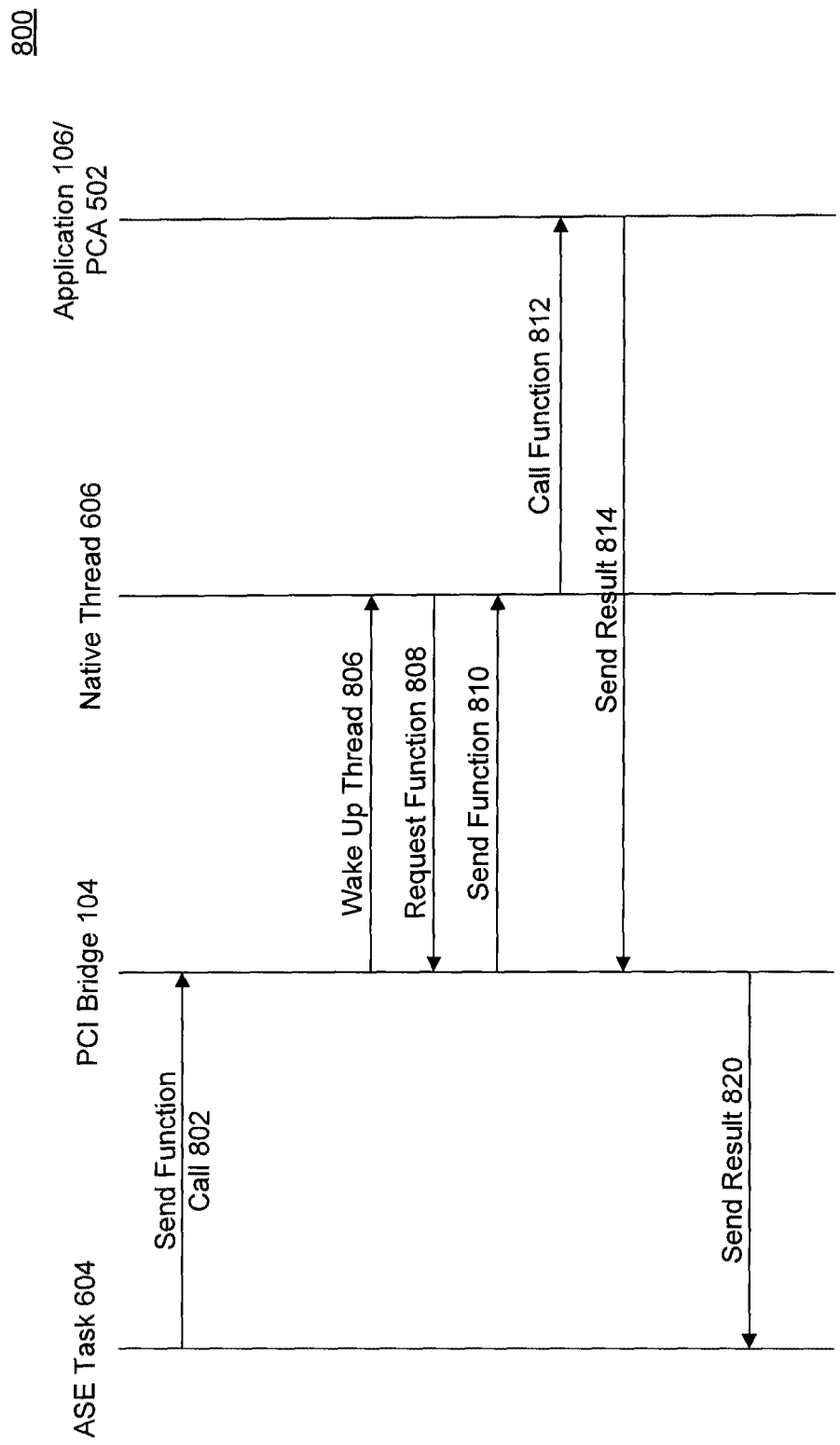
FIG. 8 is a communications flow diagram illustrating the communications between various elements, in accordance with an embodiment of the present invention.

FIG. 8 is a communications flow diagram 800 illustrating the communications between various elements, in accordance with an embodiment of the present invention. The communications of communications flow diagram 800 follow from the steps of flowchart 700, in accordance with a further embodiment of the present invention. One skilled in the relevant arts will appreciate that the precise order of the communications flow of diagram 800 is presented by way of example, and not limitation, as other orders may achieve a compatible result.

An ASE task 604, during the course of its operation, makes a function call which must be serviced by an application 106. This function call is sent at step 802 to PCI bridge 104, in accordance with an embodiment of the present invention.

PCI bridge then wakes up native thread 606 at step 806. As previously noted, native thread 606 may be among several idle native threads kept in reserve. In accordance with an embodiment of the invention, if no spare native threads are available, an additional native thread is spawned for this purpose.

Native thread 606 is configured to, upon being awoken, created, or otherwise allocated, request a pointer for the called function from the cell memory at step 808. In accordance with an embodiment of the present invention, the PCI bridge 104 translates the function call from ASE task 604 to a particular application 106 or PCA 502 function. This is handled by assigning the application 106 or PCA 502 to a slot number within PCI bridge 104.

At step 810, native thread 606 receives a pointer to the function, which it then proceeds to call at step 812. As noted above, this is commonly a call into application 106 or PCA 502, but may also point to any other set of instructions such as, by way of example and not limitation, native functions provided by the operating system.

Once the function has completed its execution, the result is sent back to the PCI bridge at step 814 for storage within cell 602. If a PCA wrapper 502 is used to wrap application 106, the PCA wrapper 502 is configured to understand where to locate the cell 602 within PCI bridge 104. One skilled in the relevant arts will appreciate that other methods for storing the result of the function call into the cell memory exist, and this particular method is presented by way of example, and not limitation.

With ASE task 604 unblocked, the task then requests the result 816 from the cell 602 within PCI bridge 104, and the result is provided to the ASE task 604 at step 820.

Figure 9:
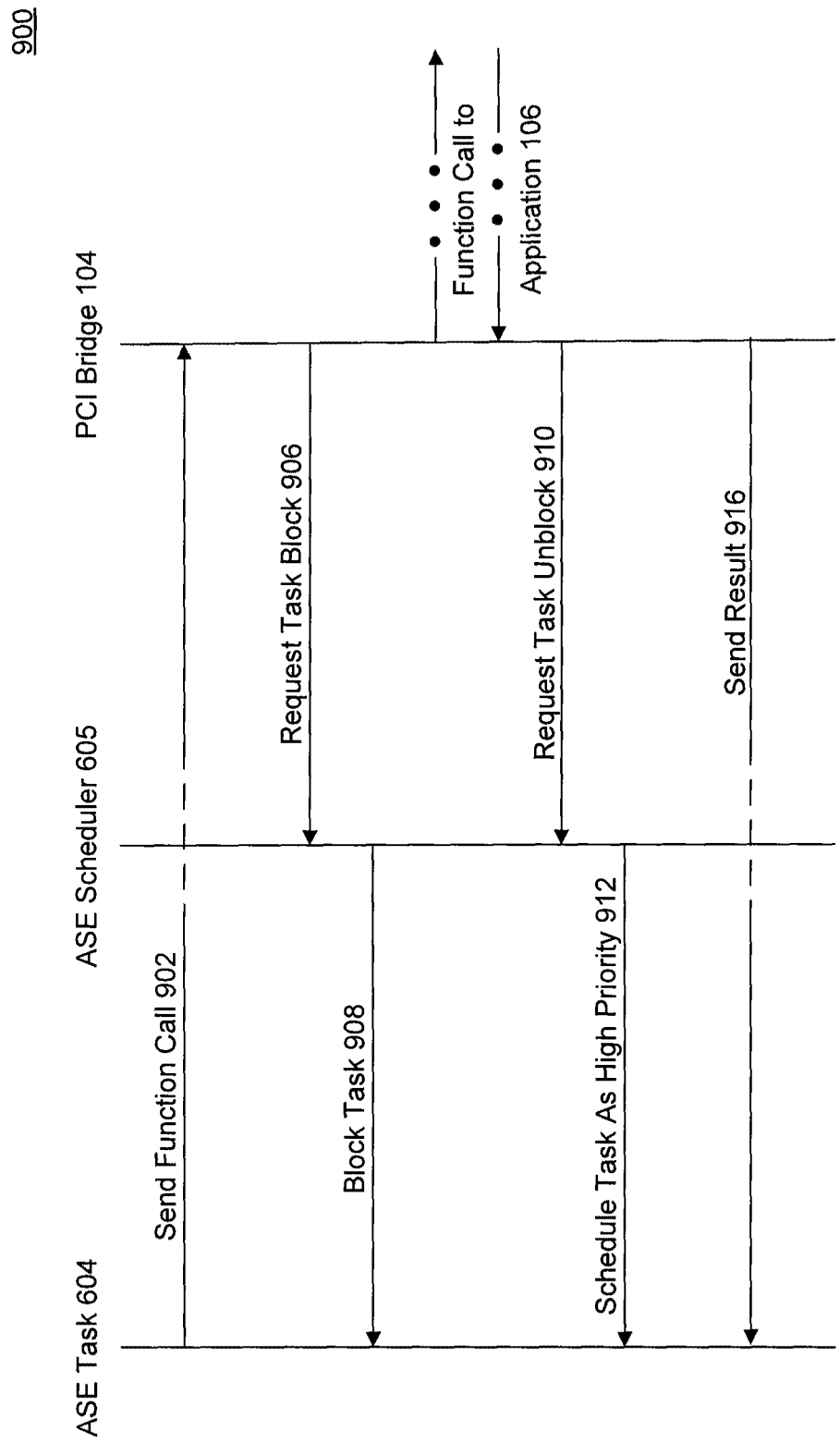
FIG. 9 is a communication flow diagram illustrating the asynchronous nature of the ASE task's function call, in accordance with an embodiment of the present invention.

FIG. 9 is a communication flow diagram 900 illustrating the asynchronous nature of the ASE task's 604 function call, in accordance with an embodiment of the present invention. At step 902, the ASE task 604 sends a function call to PCI bridge 104.

At step 906, the PCI bridge 104 notifies the ASE scheduler 605 that task 604 is being blocked by the function call. ASE scheduler then blocks task 604 at step 908, removing it from the scheduling order.

PCI bridge 104 then initiates the usual function call to the application 106 through the use of native thread 606, as shown at steps 806, 808, 810, 812, and 814 of FIG. 8, in accordance with an embodiment of the present invention.

With the result stored in the cell 602, PCI bridge 104 notifies the ASE scheduler 605 to re-schedule ASE task 604 at step 910. At step 912, ASE scheduler 605 adds ASE task 604 to the scheduling rotation at a high priority, in accordance with an embodiment of the present invention. As ASE task 604 is no longer blocked while waiting for the result of the function call, it can then immediately receive the result provided to it at step 916. In accordance with an embodiment of the present invention, ASE task 604 receives the result as a return value to the function call 902.

IV. On-Demand Function Execution

An additional disadvantage of integrating applications 106 into the monolithic RDBMS 102 executable is the memory footprint required for the additional code. End-users of the RDBMS 102 software may demand the integration of certain functionality, such as the Java Virtual Machine, in order to meet their needs. However, such integration runs the risk of alienating end-users who do not need such functionality and would prefer that the RDBMS 102 software remain lightweight and more focused in its purpose. Maintaining various development builds of the RDBMS 102, to include or not include the additional applications 106, presents its own difficulties in terms of development complexity.

By providing on-demand function execution, it is possible to package applications 106 with RDBMS 102 to meet the demands of end-users who request the applications 106, without increasing the memory footprint of RDBMS 102 for end-users who do not need the applications 106. This is accomplished by packaging the applications 106 for integration via the framework 100 of FIG. 1, in accordance with an embodiment of the present invention. Then, only when an end-user demands data from the applications 106 are the applications 106 loaded.

Figure 10:
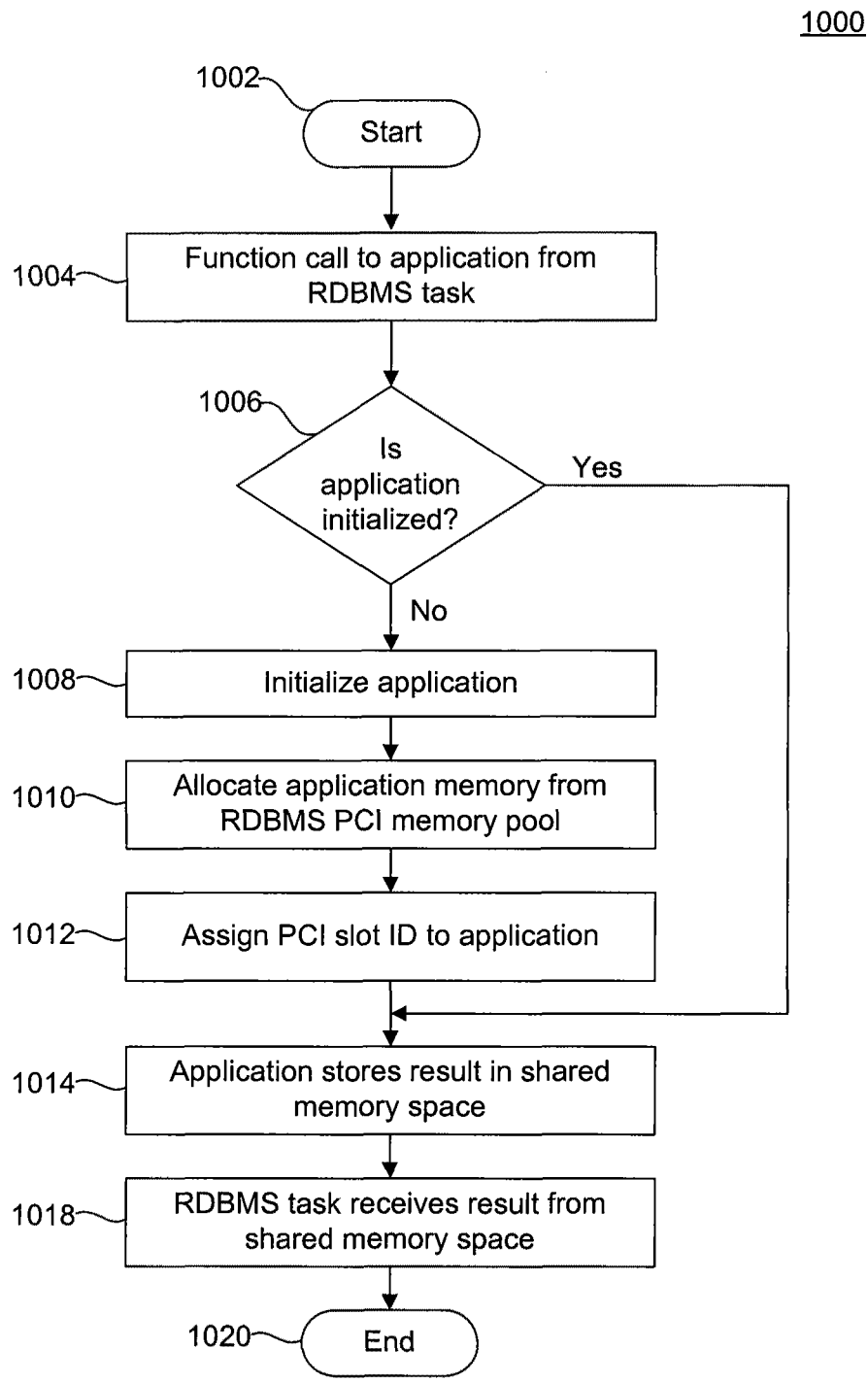
FIG. 10 is a flowchart illustrating steps by which on-demand function execution is performed, in accordance with an embodiment of the present invention.

The method by which this is performed is shown in flowchart 1000 of FIG. 10. The method begins at step 1002 and proceeds to step 1004 where the RDBMS task (e.g., ASE task 604) issues a function call to an application 106. At step 1006, a determination is made whether the application is presently initialized. If yes, the method proceeds to step 1014, but if not, the method proceeds to step 1008 where the application is initialized, and to step 1010 where memory is allocated to the application, in accordance with an embodiment of the present invention.

At step 1012, a PCI slot ID is assigned to the application, in accordance with an embodiment of the present invention. Every application is bound to its own PCI slot ID number for facilitating communications between the PCI Bridge 104 (designated as slot #0, in accordance with an embodiment of the present invention) at the application 106.

Once the application has been fully initialized, the application is ready to process the function call from step 1004. The application 106 provides a result at step 1014 within a shared memory space (e.g., cell 602). The RDBMS task receives the result at step 1018. In accordance with an embodiment of the present invention, the PCI reads the result from the shared memory space and provides it to the RDBMS task as a return value for the function call of step 1004. The method ends at step 1020.

As is noted from steps 1006-1012 of FIG. 10, the initialization process is only typically necessary once per application 106. Therefore there is no additional cost to an end-user that will frequently utilize the application 106, as the application 106 is initialized upon first usage. However, there is a significant benefit to end-users who do not intend to use application 106, as the processing cycles and memory footprint usage associated with initializing the application 106 are never incurred in this case.

Figure 11:
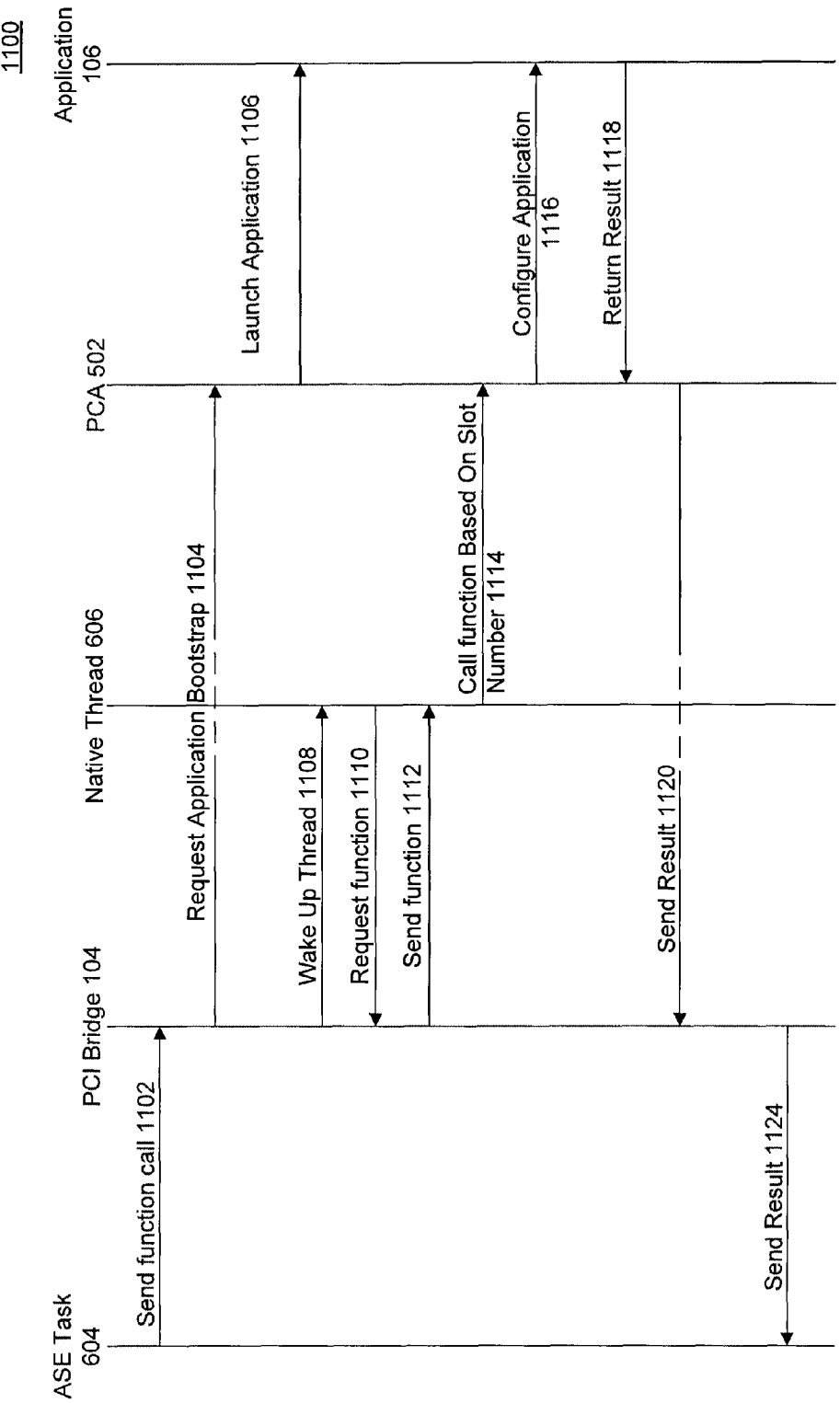
FIG. 11 is a communication flow diagram illustrating the communications process for on-demand function execution, in accordance with an embodiment of the present invention.

FIG. 11 is a communication flow diagram illustrating the communications process for on-demand function execution, in accordance with an embodiment of the present invention. At step 1102, ASE task 604 sends a function call to PCI bridge 104. PCI bridge 104 knows which slot number is associated with the function call, and requests to bootstrap the application at step 1104 if it is not yet initialized. In accordance with an embodiment of the present invention, this request is made to a PCA 502 rather than directly to the application 106 itself, as is the case where application 106 is written by a third party not for purpose-built usage with the PCI system.

PCA 502 launches the application 106 at step 1106. In accordance with an embodiment of the present invention, PCA 502 is tailored to the particular application 106 in order to properly configure the application 106 to work with the PCI system. By way of example, and not limitation, PCA 502 is configured to instruct the application 106 of the location of the shared memory space (e.g., cell 602) to which the result of its execution should be written. This configuration step is shown as occurring at step 1116. One skilled in the relevant arts will recognize that such configuration may be performed at initialization, as well as at additional points in time, such as when a function call is received by PCA 502.

As before, PCI bridge 104 allocates a native thread 606 at step 1108, either by waking up an existing spare native thread 606 or initializing a new native thread 606, in accordance with an embodiment of the present invention. Native thread 606 requests the function pointer at step 1110, and receives it at step 1112. The native thread 606 then calls the function based on the associated slot number at step 1114.

In accordance with an embodiment of the present invention, application 106 returns the result at step 1118 to the PCA 502, which then sends the result to the PCI bridge 104 at step 1120 for storage at cell 602. As before, once ASE task 604 is reactivated and scheduled, the result from cell 602 is provided to it at step 1124. In accordance with an embodiment of the present invention, the result is provided to ASE task by PCI bridge 104 by reading the result from cell 602 and providing the result as the return value for the function call of step 1102.

V. Example Computer System Implementation

Figure 12:
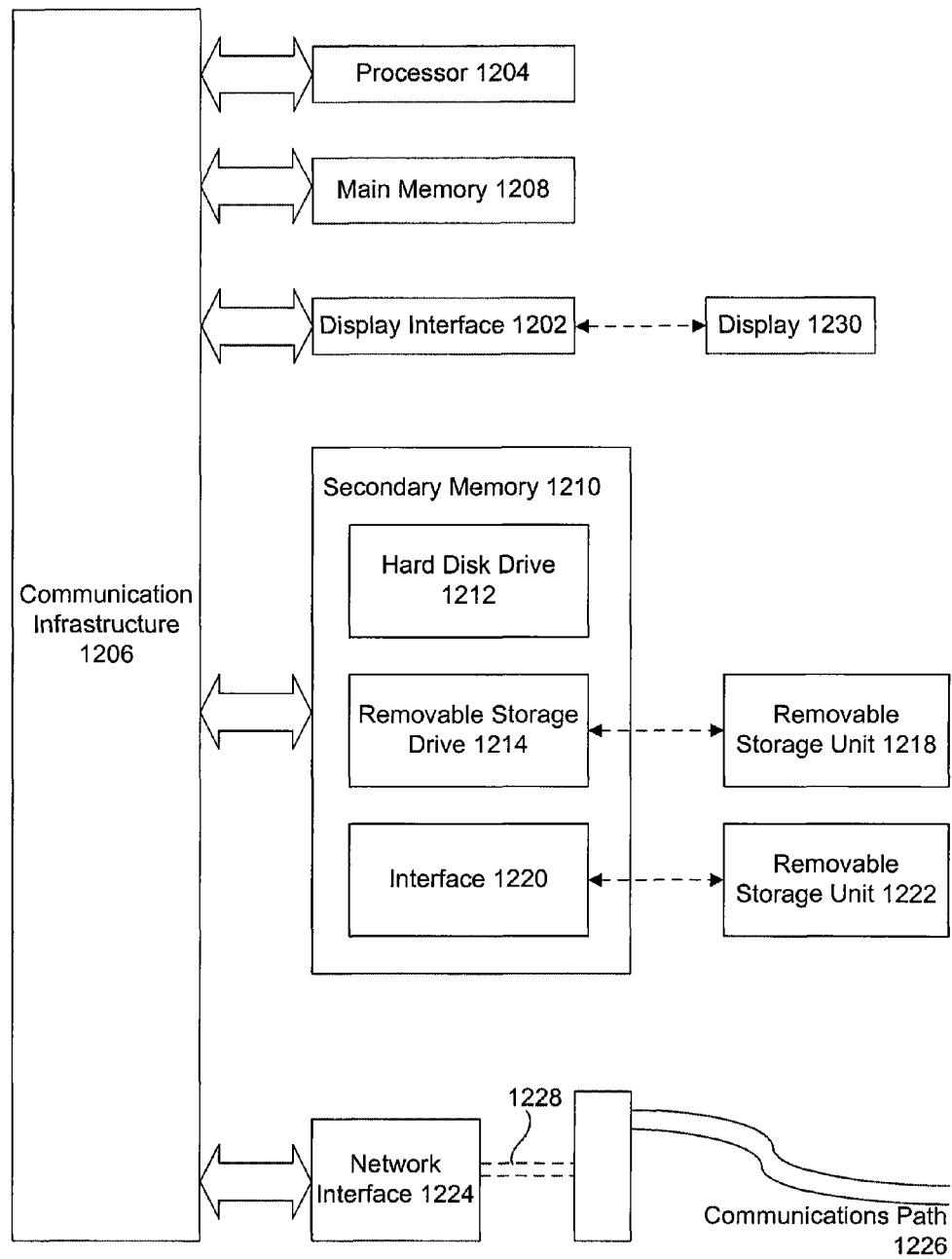
FIG. 12 depicts an example computer system in which embodiments of the present invention may be implemented.

Various aspects of the present invention can be implemented by software, firmware, hardware, or a combination thereof. FIG. 12 illustrates an example computer system 1200 in which the present invention, or portions thereof, can be implemented as computer-readable code. For example, the methods illustrated by flowcharts 300 of FIG. 3, 700 of FIG. 7, and 1000 of FIG. 10, as well as the methods illustrated by communication flow diagrams 400 of FIG. 4, 800 of FIG. 8, and 900 of FIG. 9, can be implemented in system 1200. Various embodiments of the invention are described in terms of this example computer system 1200. After reading this description, it will become apparent to a person skilled in the relevant art how to implement the invention using other computer systems and/or computer architectures.

Computer system 1200 includes one or more processors, such as processor 1204. Processor 1204 can be a special purpose or a general purpose processor. Processor 1204 is connected to a communication infrastructure 1206 (for example, a bus or network).

Computer system 1200 also includes a main memory 1208, preferably random access memory (RAM), and may also include a secondary memory 1210. Secondary memory 1210 may include, for example, a hard disk drive 1212, a removable storage drive 1214, and/or a memory stick. Removable storage drive 1214 may comprise a floppy disk drive, a magnetic tape drive, an optical disk drive, a flash memory, or the like. The removable storage drive 1214 reads from and/or writes to a removable storage unit 1218 in a well known manner. Removable storage unit 1218 may comprise a floppy disk, magnetic tape, optical disk, etc. which is read by and written to by removable storage drive 1214. As will be appreciated by persons skilled in the relevant art(s), removable storage unit 1218 includes a computer usable storage medium having stored therein computer software and/or data.

In alternative implementations, secondary memory 1210 may include other similar means for allowing computer programs or other instructions to be loaded into computer system 1200. Such means may include, for example, a removable storage unit 1222 and an interface 1220. Examples of such means may include a program cartridge and cartridge interface (such as that found in video game devices), a removable memory chip (such as an EPROM, or PROM) and associated socket, and other removable storage units 1222 and interfaces 1220 which allow software and data to be transferred from the removable storage unit 1222 to computer system 1200.

Computer system 1200 may also include a communications interface 1224. Communications interface 1224 allows software and data to be transferred between computer system 1200 and external devices. Communications interface 1224 may include a modem, a network interface (such as an Ethernet card), a communications port, a PCMCIA slot and card, or the like. Software and data transferred via communications interface 1224 are in the form of signals which may be electronic, electromagnetic, optical, or other signals capable of being received by communications interface 1224. These signals are provided to communications interface 1224 via a communications path 1226. Communications path 1226 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 1218, removable storage unit 1222, and a hard disk installed in hard disk drive 1212. Signals carried over communications path 1226 can also embody the logic described herein. Computer program medium and computer usable medium can also refer to memories, such as main memory 1208 and secondary memory 1210, which can be memory semiconductors (e.g. DRAMs, etc.). These computer program products are means for providing software to computer system 1200.

Computer programs (also called computer control logic) are stored in main memory 1208 and/or secondary memory 1210. Computer programs may also be received via communications interface 1224. Such computer programs, when executed, enable computer system 1200 to implement the present invention as discussed herein. In particular, the computer programs, when executed, enable processor 1204 to implement the processes of the present invention, such as the steps in the methods illustrated by flowcharts 300 of FIG. 3, 700 of FIG. 7, and 1000 of FIG. 10, as well as the methods illustrated by communication flow diagrams 400 of FIG. 4, 800 of FIG. 8, and 900 of FIG. 9, discussed above. Accordingly, such computer programs represent controllers of the computer system 1200. Where the invention is implemented using software, the software may be stored in a computer program product and loaded into computer system 1200 using removable storage drive 1214, interface 1220, hard drive 1212 or communications interface 1224.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

VI. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A system comprising:
a database management system; and
a bridge tightly-integrated with the database management system, wherein the bridge is assigned a bridge slot number, wherein the bridge is configured to:
   initiate an application, wherein the application is placed in communication with the database management system via the bridge,
   assign the application an application slot number, wherein the application slot number and the bridge slot number are unique reference numbers allowing interaction with the bridge and application by reference to the corresponding slot number, wherein the application slot number is associated with a segment of a shared memory space, and
   control resource allocation for the application from resources managed by the database management system.

2. The system of claim 1, wherein the database management system is configured to call a function within the application, the bridge further configured to: store information regarding the function in a shared memory space;
provide the information regarding the function to the application to call the function within the application; and
provide the location of the shared memory space to the application to store a result.

3. The system of claim 2, wherein the bridge is further configured to:
retrieve the result for the function call from the shared memory space, and
provide the result to the database management system.

4. The system of claim 1, wherein the database management system comprises:
an application programming interface which is exposed to the application.

5. The system of claim 4, wherein the database management system is further configured to receive a function call from the application via the application programming interface, to resolve the function call to produce a result, and to provide the result for the function call to the application.

6. A method comprising:
initiating an application, wherein the application is placed in communication with a database management system via a bridge;
assigning the bridge a bridge slot number;
assigning the application an application slot number;
wherein the application slot number and the bridge slot number are unique reference numbers allowing interaction with the bridge and application by reference to the corresponding slot number;
associating a segment of a shared memory space with the application slot number; and
allocating, by the bridge, application resources to the application from resources managed by the database management system.

7. The method of claim 6, further comprising:
calling a function within the application.

8. The method of claim 7, further comprising:
receiving a notification from the application that a result for the function called within the application is ready within a shared memory space; and
retrieving the result from the shared memory space responsive to the notification.

9. The method of claim 6, further comprising:
receiving a function call from the application;
resolving the function call; and
providing a result for the function call to the application.

10. A non-transitory computer-readable storage device having stored thereon computer-executable instructions, execution of which, by a computing device, causes the computing device to perform operations comprising:

initiating an application, wherein the application is placed in communication with a database management system via a bridge;

assigning the bridge a bridge slot number;

assigning the application an application slot number;

wherein the application slot number and the bridge slot number are unique reference numbers allowing interaction with the bridge and application by reference to the corresponding slot number;

associating a segment of the shared memory space with the application slot number; and allocating, by the bridge, application memory to the application from a shared memory space within the database management system.

11. The computer-readable storage device of claim 10, the method further comprising:

calling a function within the application.

12. The computer-readable storage device of claim 11, the method further comprising:

receiving a notification from the application that a result for the function called within the application is ready within the shared memory space; and retrieving the result from the shared memory space responsive to the notification.

13. The computer-readable storage device of claim 10, the method further comprising:

receiving a function call from the application via an application programming interface;

calling an operating system function responsive to receiving the function call; and providing a result for the function call to the application.

\* \* \* \* \*